M. WATANABE.
COUPLING DEVICE FOR POWER TRANSMISSION MECHANISM AND BRAKE APPARATUS FOR AN AUTOMOBILE.
APPLICATION FILED JULY 30, 1920.

1,406,119.

Patented Feb. 7, 1922.
4 SHEETS—SHEET 1.

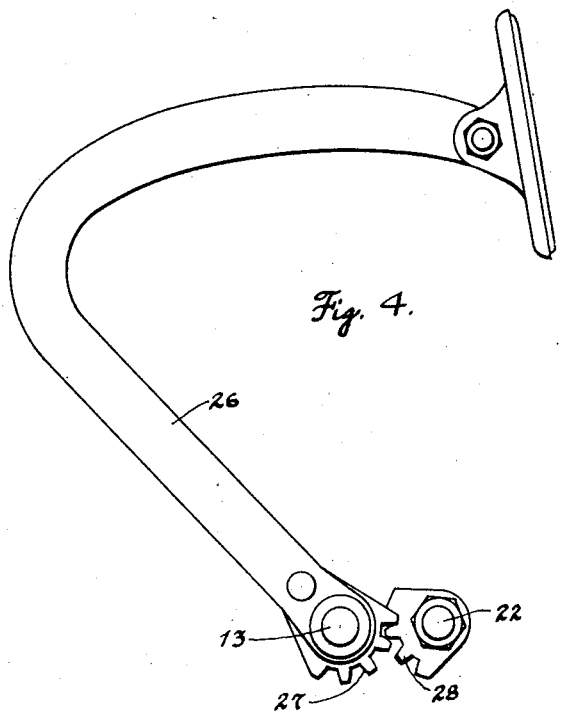
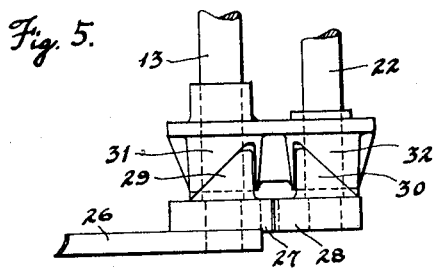

UNITED STATES PATENT OFFICE.

MASANORI WATANABE, OF TOKYO, JAPAN, ASSIGNOR TO KYOKUTO JIDOSHIA KOGYO CO., LTD., OF TOKYO, JAPAN.

COUPLING DEVICE FOR POWER-TRANSMISSION MECHANISM AND BRAKE APPARATUS FOR AN AUTOMOBILE.

1,406,119.　　　Specification of Letters Patent.　　Patented Feb. 7, 1922.

Application filed July 30, 1920. Serial No. 400,095.

*To all whom it may concern:*

Be it known that, MASANORI WATANABE, subject of the Emperor of Japan, residing at No. 39 Take-cho, Shitaya-ku, Tokyo, Japan, has invented certain new and useful Improvements in a Coupling Device for Power-Transmission Mechanism and Brake Apparatus for an Automobile, of which the following is a specification.

This invention relates to a coupling device for power transmission and brake mechanism of automobiles, wherein a planetary gearing carried on a revolving disk is disposed between the driving and driven shaft of the motor vehicle so that when the said disk is braked by means of its band, the rotary motion of the drive shaft is transmitted to the driven shaft which has rigidly fixed thereon a brake disk co-acting with a band, the two bands being controlled by rods arranged and actuated in such manner that when the rods are simultaneously moved back and forth, alternate gripping action of the disks is effected.

The object of the invention is the provision of a power transmission mechanism that is simple and efficient and capable of convenient and swift actuation.

In the accompanying drawing, wherein a preferred embodiment of the invention is illustrated:—

Fig. 4 is a side elevation of the connecting and operating means for the band actuating rods.

Fig. 5 is a fragmentary plan view of the rods and actuating means therefor, the casing transmission mechanism being removed.

Figure 3:
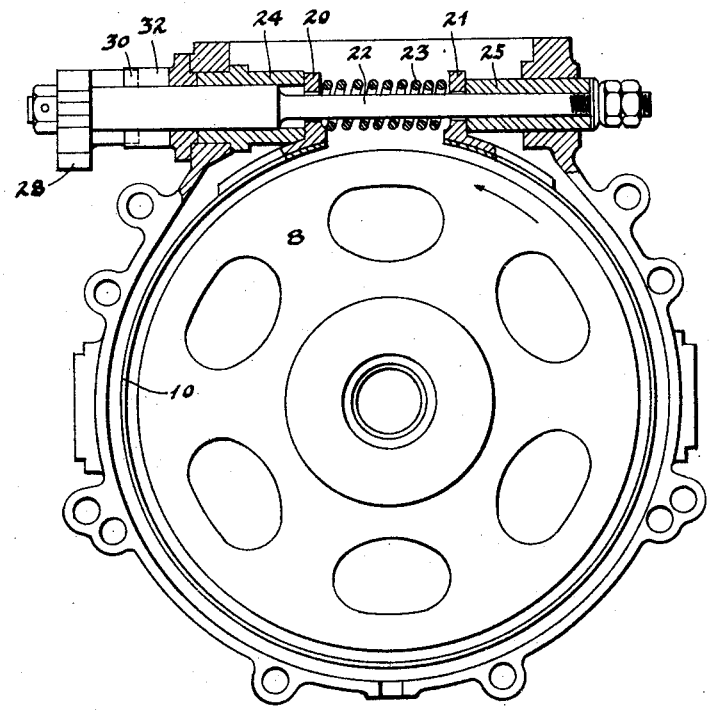
Fig. 3 is a sectional view similar to Fig. 2 taken on the plane of the brake disk or drum.

Referring to the drawing in detail, 1 indicates a driving shaft directly actuated by the engine (not shown) of a motor vehicle and 2 indicates a driven shaft adapted for connection with the vehicle propelling shaft (not shown). To the adjacent ends of the shafts 1 and 2, gear wheels 3 and 4 are non-rotatably secured and these gear wheels mesh with planetary gear wheels 6 and 7, respectively, which are mounted on a disk 5 mounted for rotation independently of the shafts 1 and 2. A brake disk or drum 8 is non-rotatably mounted upon the shaft 2 and a brake band 10 is arranged about the drum as shown in Fig. 3. Another brake band 9 is also mounted about the revolving disk 5.

When the band 9 is extended and disengaged from the disk 5, the latter and gear wheels 6 and 7 may freely revolve about the shaft 1 and in this instance the shaft 2 is not driven by the shaft 1. But in contracting the band 9, the disk 5 is held against rotation so that the rotation of the shaft 1 is transmitted to the shaft 2 through the gear wheels 3, 6, 7 and 4. If it is desired to stop the motor vehicle, it is necessary to contract the brake band 10 upon the braking wheel 8 and at the same time to release the band 9 so as to permit free movement of the disk 5 and gears 6 and 7.

By experiment it has been found most effective in contracting brake bands, to move the free end of the latter in the direction of rotation of the disk. In the present construction, the revolving disk 5 is turned oppositely to the direction of rotation of the shaft 1, when the band 9 is released or expanded and the shaft 2 is stationary, while the disks 5 and 8, when released rotate in opposite directions to each other. Therefore, the brake band control device is so arranged as to draw the free ends of the bands in opposite directions, according to the direction of rotation of the disk with which they are associated.

Figure 1:
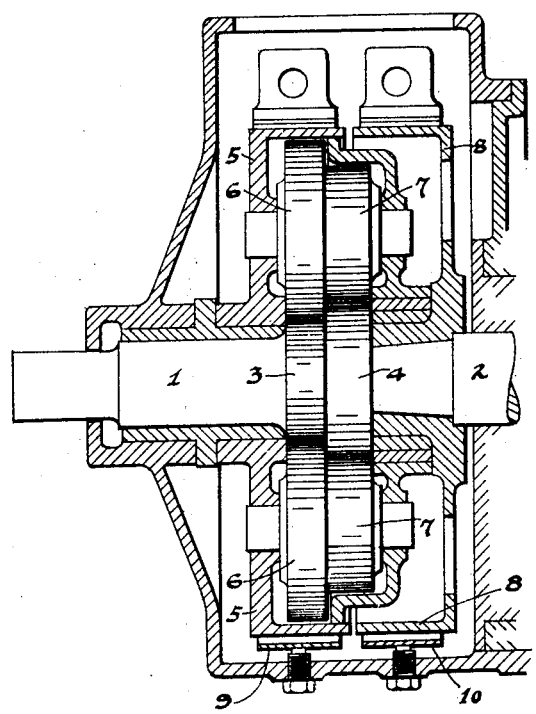
Figure 1 is a sectional view of the apparatus embodying the invention.
Figure 2:
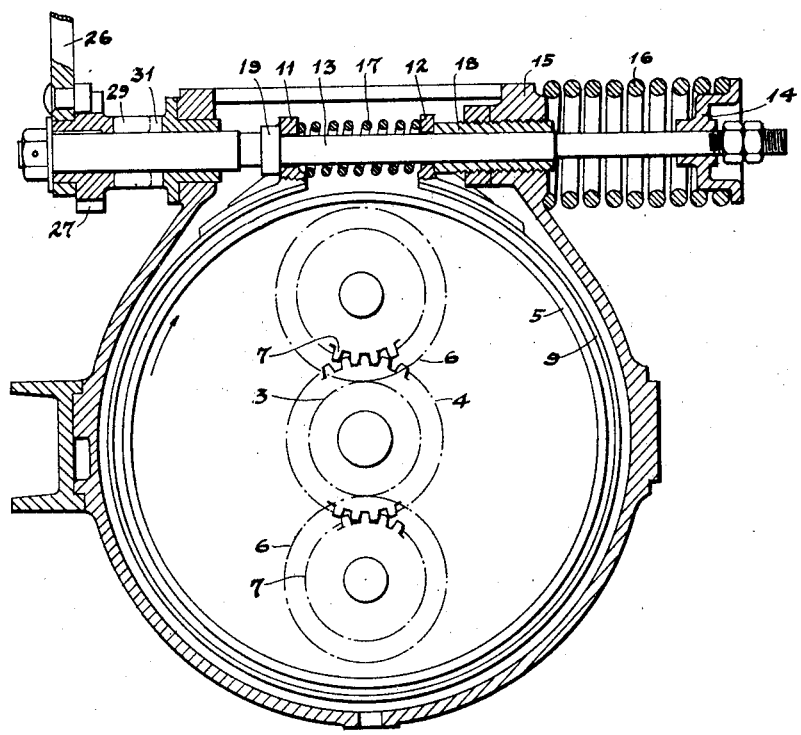
Fig. 2 is a section view through the gearing mechanism, taken at right angles to Fig. 1 and showing the driving disk and cooperating parts in detail.

The band 9 is provided with laterally projecting ears 11 and 12 rigidly fixed thereto at its ends, said ears being provided with apertures through which a rod 13 is extended. The rod 13 is extended externally of the casing 15 of the transmission mechanism and is provided at one end with an adjustable spring holder 14, a spring 16 being interposed between the casing and the holder while a spring 17 of considerably less tension than the spring 16 is interposed between the ears 12 and 11 to maintain the latter in engagement with a shoulder 19 provided on the rod 13. The ear 12 is normally maintained in engagement with a sleeve 18 threaded in a portion of the casing 15. The tension of the spring 16 normally acts to contract the band 9 about the periphery of the revolving disk 5 and it is of such strength as to overcome the tension of the spring 17 when the rod 13 is released. If the rod 13 is pulled to the left against the tension of the spring 16, the band 9 will be expanded by the spring 17 and moved out of engagement with the disk. However, when this pull is discontinued, the spring 16 acts to retract the rod 13 so as to bring the band into frictional gripping engagement with the revolving disk. As clearly shown in Fig. 2, the free end of the band 9 is drawn in the direction of rotation of the disk 5, as indicated by the arrow, during contraction of the band.

The controlling device for the band 10 of the brake drum 8 is shown in detail in Fig. 3 and includes a rod 22 mounted for longitudinal movement in the casing 15 and received in apertured ears 20 and 21 provided at the terminals of the band. The rod 22 extends through a relatively stationary sleeve 24 and an adjustable sleeve 25 which latter is mounted for sliding movement in the casing 15. An expansion spring 23 is carried about the rod 22 and is confined between the apertured ears 20 and 21 and normally tends to expand the band 10. By this construction, if the rod 22 is pulled against the action of the spring 23 to the left, in Fig. 3, to shift the ear 21 in the same direction, this operation brings the band 10 into frictional engagement with the disk 8. It will be understood that the band is immediately released from its engagement with the disk when the pull on the rod 22 is discontinued, by the spring 23. In this case, the disk 8 will revolve in the direction indicated by the arrow in Fig. 3, in an opposite direction to the disk 5, and thus the disk 8 will revolve in the same direction as the contracting movement of the band 10.

Externally of the casing 15, the rod 13 is provided with a pedal lever 26 carrying a gear segment 27, while the rod 22 is provided with another gear segment 28 rigidly secured to its end and meshing with the gear segment 27. The wheels 26 and 27 are respectively provided with projections 29 and 30 engaging cams 31 and 32 provided on the casing 15 and so arranged as to simultaneously withdraw the rods incident to rotary movement of the latter in one direction. Upon depression of the pedal 26, the rods 13 and 22 will be turned through the gear segments 27 and 28 in opposite directions, causing both rods to be moved to the left, Figures 2 and 3. However, if the pedal is released, said rods are instantly returned to the right by the tension of the spring 15, previously compressed under the pedal movement. Thus, when the pedal is released, the brake for the disk 8 is released and the shafts 1 and 2 are in driving connection. Upon forcible depression of the pedal, the brake for the disk 8 is and at the same time the disk 5 is released by its band 9 permitting rotation of the shaft 1 independently of the shaft 2. Furthermore, when the pedal is only partially depressed and held in a neutral position, both brake bands are retained out of engagement with their respective disks so as to release both shafts.

Having now particularly described and ascertained the nature of this invention and in what manner the same is to be performed, I declare that what I claim is:—

1. In a power driven mechanism, driving and driven shafts, a disk rotatable independently of the shafts, gear wheels carried by the adjacent ends of the shafts, planetary gearing carried by the disk and intermeshing with the gear wheels of the shafts, a brake drum carried by the driven shaft, brake bands arranged to cooperate with the disk and drum, means normally tending to contract one of said bands, a band controlling lever, and means connecting said band controlling lever with said brake band whereby upon actuation of the lever the respective bands are simultaneously contracted and expanded to grip and release the disk and drum.

2. In a power driven mechanism, driving and driven shafts, a rotatable disk movable independently of the shafts, gear wheels carried by the adjacent ends of the shafts, planetary gearing carried by the disk and intermeshing with the gear wheels of the shafts, a brake drum carried by the driven shaft, brake bands arranged to cooperate with the disk and drum, brake band actuating rods mounted for sliding movement, means for effecting corresponding and simultaneous axial movements of said rods, and means connecting said rods with the brake bands whereby one band is released simultaneously with the contraction of the other and vice versa.

3. In a power driven mechanism, a planetary gear carrying disk, a brake drum, brake bands associated with said disk and drum, means normally tending to expand said brake bands, rods engaging said bands, means associated with one of said rods operable, when the latter is released, to contract the band associated therewith against the influence of the band expanding means, and means to effect simultaneous actuation of said rods whereby one band is forcibly contracted simultaneously with the release and expansion of the other band.

4. In a power driven mechanism, a disk, a brake drum, brake bands associated with the drum and disk, band actuating rods, means connecting said rods for transmitting rotary movement of one rod to the other rod, means responsive to the rotary movement of said rods to effect corresponding and simultaneous longitudinal displacement thereof, and means connecting said rods with said bands whereby the latter are alternately released and contracted.

In testimony whereof he affixes his signature in the presence of two witnesses.

MASANORI WATANABE. [L. S.]

Witnesses:
 GEUJI KURIBARA,
 A. NAKAO.